US 8,375,593 B2

(12) United States Patent
Lundgren et al.

(10) Patent No.: US 8,375,593 B2
(45) Date of Patent: Feb. 19, 2013

(54) SUSPENSION OF A MEASUREMENT WHEEL USING A SHOCK-ABSORBING DOUBLE-ACTION HYDRAULIC CYLINDER

(75) Inventors: Karl Lundgren, Umeå (SE); Anders Lindblom, Umeå (SE); Peter Kjellren, Röbäck (SE)

(73) Assignee: Komatsu Forest AB, Umea (SE)

(*) Notice: Subject to any disclaimer, the term of this patent is extended or adjusted under 35 U.S.C. 154(b) by 182 days.

(21) Appl. No.: 13/000,258

(22) PCT Filed: Jun. 22, 2009

(86) PCT No.: PCT/SE2009/050787
§ 371 (c)(1),
(2), (4) Date: Mar. 23, 2011

(87) PCT Pub. No.: WO2010/002339
PCT Pub. Date: Jan. 7, 2010

(65) Prior Publication Data
US 2011/0162719 A1 Jul. 7, 2011

(30) Foreign Application Priority Data
Jul. 1, 2008 (SE) ........................................ 0801560

(51) Int. Cl.
*G01B 3/00* (2006.01)
(52) U.S. Cl. .................... 33/501.02; 33/555.1
(58) Field of Classification Search .............. 33/501.02, 33/501.03, 501.04, 773, 778, 551, 553, 555, 33/550, 521, 533
See application file for complete search history.

(56) References Cited

U.S. PATENT DOCUMENTS

| 4,577,411 | A | * | 3/1986 | Martin ............................ 33/778 |
| 4,896,866 | A | | 1/1990 | Legrand et al. |
| 5,936,398 | A | * | 8/1999 | Bellefeuille .................... 33/778 |
| 5,957,177 | A | | 9/1999 | Smith et al. |
| 6,176,170 | B1 | | 1/2001 | Uppgard et al. |
| 6,647,636 | B2 | * | 11/2003 | Fukuhara et al. .......... 33/501.02 |
| 6,952,884 | B2 | * | 10/2005 | Danielli ..................... 33/555.1 |
| 2008/0128051 | A1 | * | 6/2008 | Isley et al. .................... 144/343 |
| 2008/0148591 | A1 | * | 6/2008 | Kao Lin .......................... 33/772 |
| 2011/0162719 | A1 | * | 7/2011 | Lundgren et al. ................ 137/1 |

OTHER PUBLICATIONS

International Search Report and Written Opinion from corresponding Application No. PCT/SE09/50587.

* cited by examiner

*Primary Examiner* — Yaritza Guadalupe-McCall
(74) *Attorney, Agent, or Firm* — Renner, Otto, Boisselle & Sklar, LLP

(57) ABSTRACT

The invention concerns to a method and arrangement for a suspension system that may be constituted by a harvesting trait of a forestry harvester and which suspension system is of the type that has a wheel supported and provided with an angle sensor in order to form a measurement wheel for the measurement of length, with an arm pivotably attached to a frame in such a manner that the wheel can be adjusted from positions in contact with and out of contact with a surface of the object whose length is to be measured while the object is fed in its longitudinal direction past the measurement wheel running against the circumference of the measurement wheel, whereby the said object may be constituted by a tree trunk taken up into a harvester unit.

9 Claims, 2 Drawing Sheets

Figure 1:
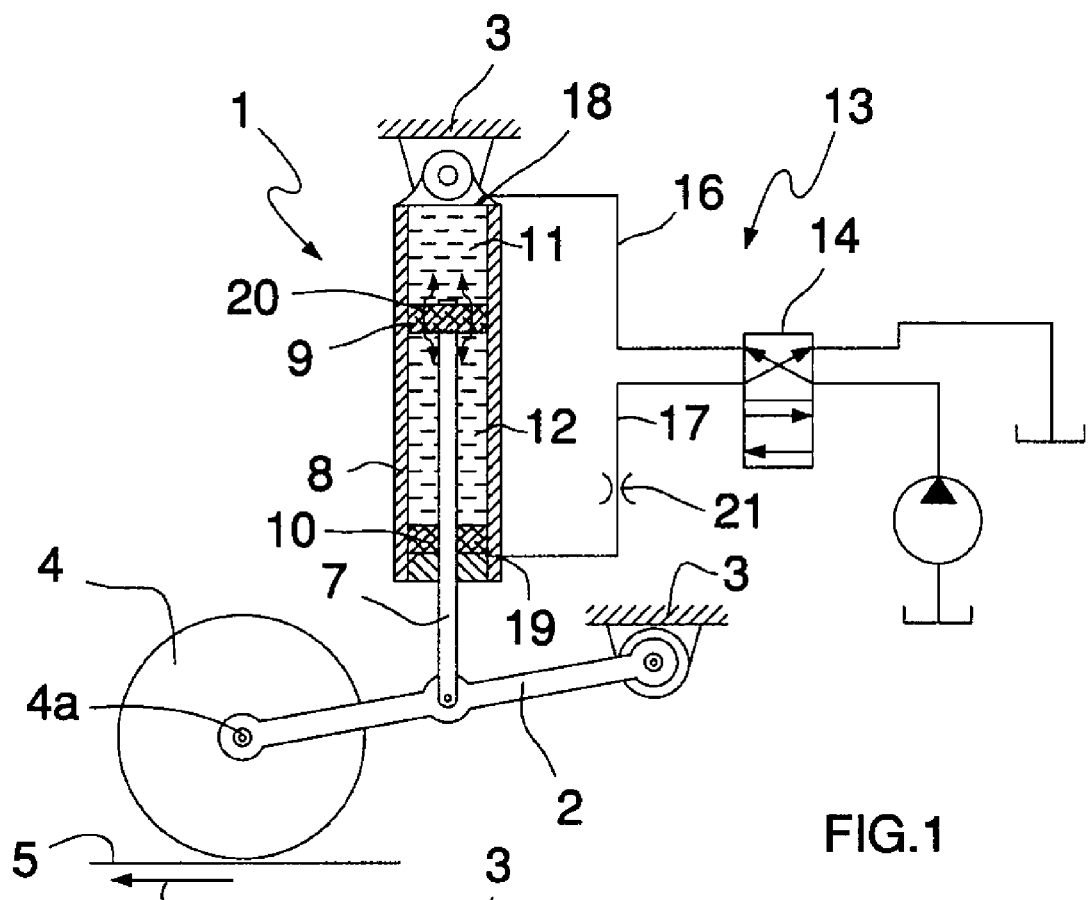

SUSPENSION OF A MEASUREMENT WHEEL USING A SHOCK-ABSORBING DOUBLE-ACTION HYDRAULIC CYLINDER

The present invention concerns a method for a suspension system that supports in a manner that allows it to pivot a wheel on an arm intended to roll against a surface for length measurement of this surface according to the introduction to claim 1 and a double-action shock-absorbing hydraulic cylinder intended to be used with the method according to the introduction to claim 5.

Hydraulic cylinders of double-action type are used for suspension systems in which it is desired to move a mobile part (i.e. the suspension) relative to a fixed part. It is in certain cases desired not only to move the mobile part but also to absorb undesired vibrations in this part. The suspension system may, for example, be constituted by a moving part in the form of an arm whereby the fixed part may be constituted by a frame to which the arm is attached in a manner that allows it to pivot, whereby the cylinder is arranged between the moving part and the fixed part. For suspension systems that support a measurement wheel for length measurement of a surface of an object, it has proved to be desirable not only to move the wheel to and from the surface in a double-action manner, but also to press the wheel against the surface with a certain retentive force, in order to obtain high friction during the measurement process, while at the same time the retentive force absorbs shocks such that irregularities in the surface are leveled out.

One example of an application in which the properties described above would be of particular interest is arrangements for the length measurement of tree trunks, where these arrangements are components of harvester units of forestry machines. This is to say that the application is with a multi-function gripper coupled to a terrain vehicle through a mobile arm in which tree trunks are trimmed, measured and cut to give timber of pre-determined lengths. Known suspension systems for length measurement comprise a swing arm fixed to the frame of the harvester at the end of which swing arm a wheel is mounted in bearings, which wheel is provided with an angle sensor and forms a length measurement wheel that can be rolled along the tree trunk. The swing arm is held under a spring force against the tree trunk in such a manner that the measurement wheel automatically comes into contact with the tree trunk by the influence of the spring force when the tree trunk is gripped by the gripping means that is part of the harvester, and is pressed into the harvester by means of the gripping means. Vibrations, bumps and collisions arise since a tree trunk normally demonstrates irregularities in the form of shape errors, protrusions from incompletely trimmed branches and curves and indentations. When transferred to the measurement wheel these vibrations, bumps and collisions have a negative influence on the measurement precision. In certain cases, the measurement wheel suspended under tension may even bounce in an uncontrolled manner along the tree trunk.

Known double-action hydraulic cylinders, which it would be conceivable to use for the purpose since they can be adjusted such that they act in a shock-absorbing manner, comprise two fluid-filled chambers that are separated from a piston unit that moves in a reciprocating motion within a cylinder, which piston unit consists of a piston with its associated piston rod. An inlet is arranged at each chamber for the influx of fluid whereby the mobile part is displaced and placed into various operating positions relative to the fixed part through the chambers being alternately placed under pressure and drained of their fluid content. When damping is desired, the two chambers are placed in connection with a circuit such that fluid can flow between the two chambers, which means that the piston unit can move freely in the working volume of the cylinder, i.e. the piston unit "floats" and the cylinder acts as a damper. In order to be able to regulate the damping, the circuit may be provided with a throttle valve, with whose help the fluid flow between the chambers can be limited. With the aid of a further hydraulic system with a directive valve connected to the hydraulic cylinder, the latter can be adjusted such that it exerts its impact force in two directions or, alternatively, function as a damper.

The disadvantage of the said known double-action hydraulic cylinders is principally that they cannot exert a force of pressure while they are in their floating condition, i.e. when in their shock-absorbing condition. This is a significant problem, as has been described above, since it is desirable in certain applications to have a double-directed operating motion; for example, in order to be able to move a machine component between a withdrawn position and an extended position while offering, at least in the extended position of the machine component, not only a retentive force but also a shock-absorbing effect. Known systems of this type are therefore normally supplemented with a power-exerting means such as a spring of mechanical or gas-filled type that acts in a power-exerting manner when the cylinder is adjusted to work in its shock-absorbing floating condition. A second disadvantage is that the hydraulic control circuits that are required for the cylinders to function in their shock-absorbing floating condition are relatively extensive and complicated, which results in systems that are slow to react, due to the large volumes of fluid that flow through the lines and the occurrence of losses due to friction and falls in pressure. For this reason, the systems can be used in practice only to damp relatively large oscillations, and they are not suitable at all to be used in, for example, systems in which only small oscillations with low amplitude are to be damped. One example of such an application is the above-mentioned arrangements for the length measurement of tree trunks in harvesters.

A first purpose of the invention is to achieve a method for a suspension system of the type that has an arm that supports a wheel intended to be rolled against a surface that moves relative to the measurement wheel where the system can be displaced in a simple manner when measurement is not to take place, and to offer the required friction against the surface even if the surface is uneven. A second purpose of the invention is to achieve a double-action shock-absorbing hydraulic cylinder that is suitable for use with the method. To be more precise, a system is desired that makes possible rapid adjustment between pre-determined working conditions or operating conditions and that acts as a shock-absorber while at the same time delivers a retentive force or impact force The latter purpose is desired such that it is possible to obtain a suitable damping force when the measurement wheel bounces against obstacles that protrude from the surface, such as curved features and protrusions from branches on a tree trunk.

These purposes are achieved through the method and the arrangement according to this invention obtained through the characteristics and properties specified in claim 1 and claim 5, respectively.

The insight that forms the basis of the method according to the present invention is that it would be possible to avoid the problems with the inability of measurement wheels that are suspended in a manner that allows pivoting to follow a surface in a controlled manner with the friction required and with the desired precision if it were possible to drive the measurement wheel with a combination of shock absorption and force against the surface that is to be measured. It is, however, still necessary that the measurement wheel can be displaced when it is not needed, and it is necessary that it can be presented for measurement very rapidly. This is desirable for harvester units in forestry harvesters since the harvester unit can be used for tasks in which the measurement of the lengths of tree trunks is not necessary, such as felling trees, handling timber by the gripping means of the unit, etc. It would be an advantage during the said tasks if the measurement wheel for measurement of length could be displaced such that it is not in the way during the said tasks. The possibility of very rapidly being able to present the measurement wheel requires that the system be designed to work with as low a volume of fluid as possible, particularly during the procedure for presenting the measurement wheel. The present hydraulic cylinder, in contrast to known arrangements, requires to work with only the limited volume of fluid that is present in the working volume of the cylinder and not with the significant volume of fluid that is present throughout a complete hydraulic system, i.e. not only this fluid but also the significant volume of fluid that may be present in the other circuits and line networks of the system. This means that the present cylinder arrangement demonstrates very rapid response times when it is working as a double-action operating unit while at the same time operating as a shock-absorber.

Figure 2:
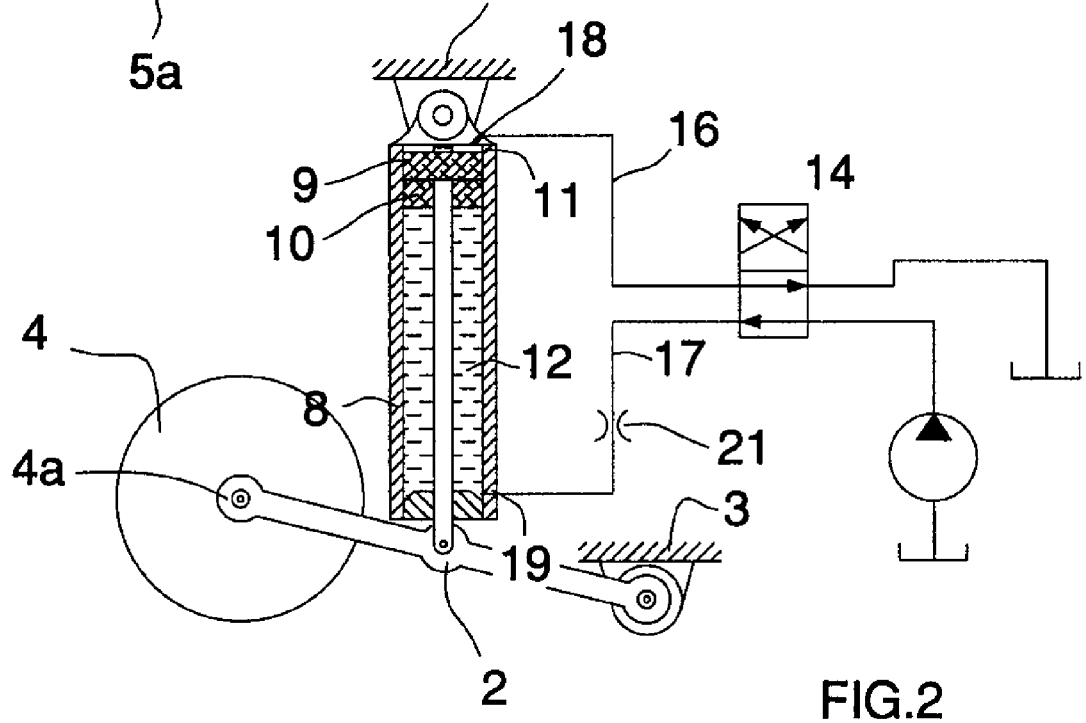
Figure 3:
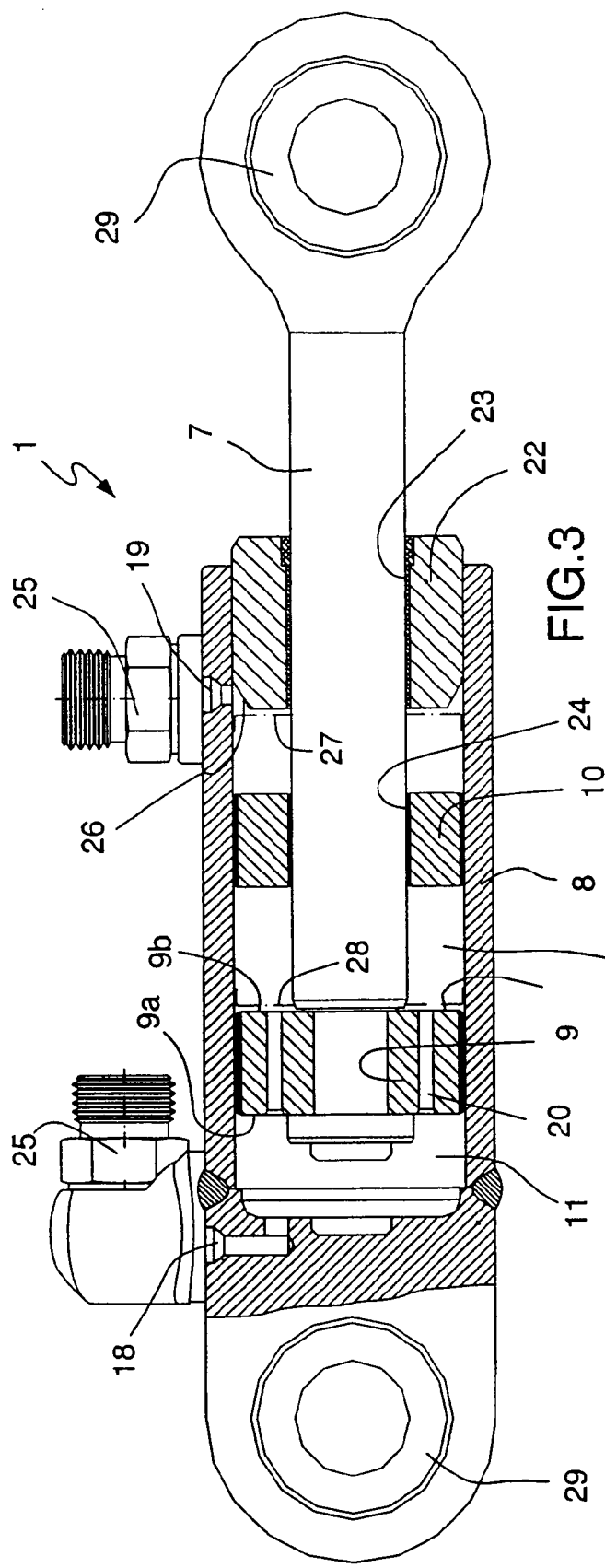
Figure 5:
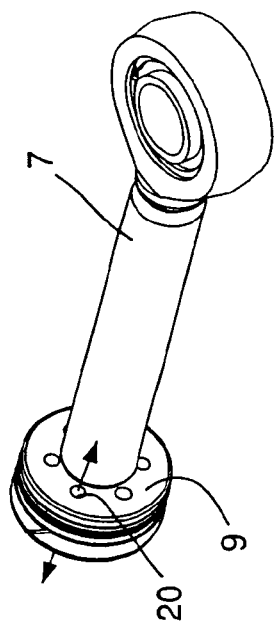
Figure 4:
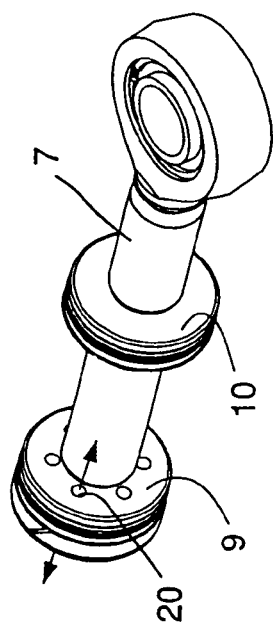

The invention will be described in more detail below with reference to the attached drawings, in which:

FIG. 1 shows schematically, partially in longitudinal section, a suspension system according to the invention and a double-action shock-absorbing hydraulic cylinder with its associated control circuits that are components of the system, FIG. 2 shows a schematic view corresponding to that in FIG. 1, with the hydraulic cylinder now set in its withdrawn position, FIG. 3 shows a longitudinal section through the double-action shock-absorbing hydraulic cylinder according to the invention in greater detail, FIG. 4 shows a perspective view of a piston unit that is a component of the hydraulic cylinder shown in FIG. 3, with the associated piston rod in a first design with secondary piston means, FIG. 5 shows a perspective view of the piston unit that is a component of the hydraulic cylinder shown in FIG. 3, with the associated piston rod in an alternative design without secondary piston means.

The hydraulic cylinder a shown in FIGS. 1 and 2 is a double-action cylinder, i.e. it can exert force in both directions of travel (the positive direction and the negative direction), and it is described below as a hydrostatically active part of a suspension system for an arm 2 that is united in a manner that allows it to pivot to a frame 3 that is part of, for example, a machine. The suspension system forms in the embodiment a part of an arrangement for the measurement of length of tree trunks, which arrangement is a part of a harvester unit of forestry harvesters. It should be understood that the system as such is, naturally, not limited to this design, which is given as an example.

In the example that is shown, the arm 2 supports a wheel 4, and it is intended that it should be possible to pivot the wheel by means of the arm between a withdrawn position and an extended position relative to the frame 3, and to roll the wheel with the offering of a certain retentive force when it is in its said extended position against a surface 5 or a support that is constituted by a tree trunk that is drawn or fed along its longitudinal direction as is indicated by the arrow 5a towards the circumference of the wheel. The task of the hydraulic cylinder 1 is to ensure that the wheel 4 can be rapidly repositioned from its withdrawn resting position as shown in FIG. 2, such that it is driven down into is extended position by a force and retentively held in contact with the surface 5, as shown in FIG. 1 while at the same time, rolling against the surface, it absorbs bumps and collisions caused by any irregularities that are present on the surface. The wheel 4 is provided with an angle sensor 4a for measurement of the length of the surface against which it is rolled.

The arm 2, which is connected to the frame 3 in a manner that allows pivoting, acts through a piston rod 7 on a primary piston 9 that can be displaced in the cylinder 8. A secondary piston 10 is located in the cylinder 8, which secondary piston can be displaced in a controlled manner along the piston rod 7. The cylinder 8 is filled with fluid and it is divided by the primary piston 9 into a first chamber 11 and a second chamber 12, whereby the piston rod 7 extends through the said second chamber and onwards out through one end of the cylinder. A circuit 13 that includes, among other items, a valve 14 for controlling the direction of the fluid, and lines 16, 17, allows the two chambers 11, 12 to be supplied with pressurised fluid or drained of their fluid contents, through an inlet 18 and 19, respectively arranged at each chamber, whereby the arm 2 can be positioned relative to the frame 3 in the manner that a careful study of the drawings will make clear. In other words, when one chamber 11 is supplied with fluid through its inlet 18, the other chamber 12 is drained of fluid through its inlet 19, and vice versa, In order to facilitate understanding in the following description, the two inlets 18 and 19 will be referred to, where appropriate, as the "first" and the "second" inlet, respectively, in order to make clear that they belong to the first chamber 11 and the second chamber 12 of the cylinder, respectively.

In order for it to be possible that the hydraulic cylinder 1 act in a shock-absorbing manner, the primary piston 9 is provided with channels 20 that allow fluid to be transferred between the chambers 11 and 12 through the primary piston, as is illustrated by double arrows in FIG. 1. The primary piston 9 is designed such that it interacts with the secondary piston 10 in a manner that blocks the flow of fluid such that the fluid-transfer connection between the chambers 11, 12 is interrupted when the primary and the secondary piston are located in contact with each other or in a position at which either one of the pistons accompanies the other in a mobile manner in the cylinder 8. Such a position in which the flow has been interrupted is shown in FIG. 2.

The secondary piston 10 and the inlet 19 to the second chamber are furthermore so mutually designed that the secondary piston 10 can be placed into a position at which it blocks the flow out from the cylinder 8 through the second inlet 19, or—to be more precise—it blocks the flow from the second chamber 12 through the inlet 19. An example of such a blocking position is shown in FIG. 1. Furthermore, the secondary piston 10 and the second inlet 19 are so mutually designed such that the secondary piston 10 is driven through the cylinder when pressurised fluid is supplied to the inlet 19 of the second chamber 12 (from a position at the bottom and upwards in FIGS. 1 and 2) until it makes contact with the primary piston 9. FIG. 1 should be consulted for a better understanding of the phenomenon just described, in which it should be realised that the secondary piston 10 is driven upwards as seen in the drawing in the direction towards the primary piston 9 if the valve 14 is switched such that the second chamber 12 is filled with fluid through its inlet 19 while the first chamber at the same time is drained through its inlet 18. A constriction 21 that is part of the circuit 13 located in association with the inlet 19 of the second chamber 12 makes it possible to control the speed at which the arm 2 is moved.

It should be realised that the piston unit 7, 9 will protrude from the cylinder 8 with force, through the influence of hydraulic imbalance between the end surfaces 9a and 9b of the primary piston 9, i.e. through the use of different effective areas in which the end surface 9a that faces the first chamber 11 is larger than the end surface 9b that faces the second chamber 12 from which the piston rod originates. Despite this, the cylinder 1 in this way retains its ability to absorb shocks through the fluid being at the same time allowed to be exchanged between the two chambers 11, 12 through the channels 20. Not only the double-directed impact force of the cylinder 1 but also its damping ability can be varied by adapting the effective areas of the primary piston 11, i.e. the end surfaces 9a, 9b, the fluid pressure, and other parameters.

FIGS. 3 and 4 show the double-action hydraulic cylinder 1 in greater detail, and the drawings make it clear that the cylinder 8 demonstrates a circularly cylindrical working chamber, whereby the primary piston 9 has been given a piston body of corresponding form. The piston rod 7 is attached to the said primary piston 9, and its movement out through the cylinder 8 is controlled through a combined sealing and rod-control unit 22 that is arranged at the end of the cylinder 8 that is normally denoted by the term "piston rod end". The combined sealing and rod-control unit 22 has a central opening 23 through which the piston rod 7 extends. The channels 20 that are arranged in the primary piston 9 comprise axial drilled holes whereby movement in the cylinder 8 is transferred in a double-directed manner between the two chambers 11, 12 during displacement of fluid and thus also during damping of the movement of the primary piston 9 in the cylinder 8. It is possible to control by selection of the area of the drilled holes relative to the effective areas of the primary piston 9 (the two end surfaces 9a and 9b that face away from each other) not only the displacement or shock-absorbing action of the adjustment arrangement 1 but also the hydraulic imbalance and thereby also the force of pressure of the cylinder obtained through the motion of the piston rod 7 out from the cylinder under the influence of the said damping action.

The secondary piston 10 demonstrates a circularly symmetrical piston body and is located between the primary piston 9 and the combined sealing and rod-control unit 22 in the piston rod end of the cylinder. It has also a central opening 24 through which the piston rod 7 extends. It is possible to displace in a controlled manner the secondary piston 10 along the piston rod 7 with the aid of the said central opening 24 such that the secondary piston can move freely, or "float" through the second chamber 12 of the cylinder 8 during the formation of a ring-shaped barrier that seals fluid leakage. The secondary piston 10 is designed in known manner such that it prevents leakage of fluid not only at the inner surface of the cylinder 8 but also at the periphery of the piston rod 7. Connection nipples 25 are arranged at the inlets 18 and 19 for the connection of pipes. The inlet 18 of the first chamber 11 comprises a drilled hole that leads in to the said first chamber. The inlet 19 of the second chamber comprises a ring-shaped depression 26 that is arranged in the combined sealing and rod-control unit 22, whereby the secondary piston 10 and the depression are so mutually designed that the secondary piston 10 prevents fluid from flowing out from the second chamber 12 through the inlet 19 of this chamber when the piston is located in contact with the sealing and rod-control unit 22. This alternative position is illustrated by the dot-dash line 27 in FIG. 3. It should be realised also that when pressurised fluid is supplied to the second inlet 19, the secondary piston 10 is driven through the cylinder by the fluid pressure (from a position at the bottom and upwards in FIGS. 1 and 2) until it makes contact with the primary piston 9. This alternative position is illustrated by the dot-dash line 28 in FIG. 3. The hydraulic cylinder 1 is provided with attachment means 29 in the form of attachment lugs located at the bottom end of the cylinder and at the free end of the piston rod 7, for mounting and to form part of a suspension system.

FIG. 5 shows the piston unit in an alternative design consisting of the primary piston 9 and the piston rod 7, i.e. in a design in which the secondary piston 10 has been removed. It should be realised that this design makes it possible to achieve as rapid and efficient extension of the measurement wheel from its resting position as that possible using the preferred design that has been described above. The design offers, in the same way, that the measurement wheel 4 not only be placed in contact with the surface 5 with force, but also that it works with a shock-absorbing effect. An external means, however, such as a spring or similar must be used for the return movement of the piston unit and thus also of the measurement wheel 4 into its withdrawn resting position that is shown in FIG. 2.

The arrangement described above will now be described in more detail with respect to its function under the assumption that pressurised fluid flows into the first chamber 11 through the inlet 18 while the second chamber 12 is drained of its fluid content through the inlet 19. It should be realised that the primary and secondary pistons 9, 10 in this case are in interactive contact with each other and they move together in the downwards direction in the drawing towards the sealing and rod-control unit 22 at the piston rod end of the cylinder 8. The piston rod 7 protrudes from the cylinder 8 during this motion, whereby the arm 2 is moved downwards such that the wheel 4 makes contact with the surface 5 with force. The secondary piston 10 continues to move downwards and towards the sealing and rod-control unit 22 while fluid passes through the channels 20 as long as fluid flows into the first chamber 11 and fills it. When the secondary piston 10 finally makes contact with the combined sealing and rod-control unit 22, the inlet 19 of the second chamber becomes blocked such that fluid is no longer drained from the cylinder 8. The piston unit 7, 9 is driven under force out from the cylinder 8 by the hydraulic imbalance between the end surfaces 9a and 9b of the primary piston 9, and it thus presses the wheel 4 down towards the surface 5 while a shock-absorbing effect is obtained at the same time through fluid exchange between the chambers 11, 12 through the channels 20 of the primary piston 9. This condition is shown in FIG. 1 and it is maintained during the complete measurement process. For the return of the arm 2 and its pivoting in the upwards direction to its original position as shown in FIG. 2, the direction of flow is reversed such that fluid is led in through the second inlet 19 to the ring-shaped depression 26 that is limited between the secondary piston 10 and the sealing and rod-control unit 22 in the piston rod end of the cylinder 8. The secondary piston 10 is driven by the influence of the fluid pressure in the upward direction in the drawing until it makes contact with the primary piston 9, whereby the channels 20 become blocked. Thus the unit 9, 10 that is formed by these two parts subsequently moves as a single unit towards the bottom of the cylinder whereby the arm 2 is pivoted upwards, lifting the wheel 4 to the position that is shown in FIG. 2.

The present invention is not limited to what has been described above and shown in the drawings: it can be changed and modified in a number of different ways within the scope of the innovative concept.

The invention claimed is:

1. A method for a suspension system of the type that has an arm on which a wheel is supported and provided with an angle sensor in order to form a measurement wheel for the measurement of length of an object, and which arm is attached in a manner that allows it to pivot to a frame in such a manner that the wheel can be adjusted from positions in contact with and out of contact with a surface of the object whose length is to be measured while the object is fed in its longitudinal direction past the measurement wheel running against the circumference of the measurement wheel, the method comprising:

that the suspension system is assigned means that allow the measurement wheel to be moved between a withdrawn resting position and an extended measurement position relative to the frame;

that the suspension system is assigned means that allow the measurement wheel to move in a manner that provides shock absorption relative to the frame during the measurement process;

that a measurement process for the measurement of length of a surface is initiated with the measurement wheel being moved forwards from the resting position to make contact with the surface;

that the measurement wheel is placed in contact with the surface under force during the complete measurement process and that this takes place through the influence of the operating agent;

that the measurement wheel is moved back to its withdrawn resting position after completion of the measurement process.

2. The method according to claim 1, wherein a hydrostatic system is used as a means of moving the measurement wheel, designed to maintain a combination of shock absorption and a constant force of pressure against the surface during the measurement process by the use of a primary piston in the system that demonstrates different effective piston areas and a channel for the passage of fluid through the piston.

3. The method according to claim 2, wherein a secondary piston is used in addition to the primary piston, which secondary piston is arranged such that it not only enters into alternating interaction that blocks the flow of fluid with the channel of the primary piston but also with the inlet to the chamber against which the relatively smaller area of the primary piston faces, depending on the fluid pressure from a first and a second inlet for the introduction of fluid into the respective chamber towards which the respective piston areas of the primary piston face.

4. The method according to claim 1, wherein a constriction that limits flow is used to control not only the speed of movement of the measurement wheel relative to the frame, but also the shock-absorbing effect of the system.

5. A shock-absorbing double-action hydraulic cylinder comprising a first and a second fluid-filled chamber that are separated by means of a piston that move in a reciprocating manner in the cylinder, a piston rod attached to the piston that passes through the second chamber and extends onwards out through an opening located in a combined sealing and rod-control unit in the piston rod end of the cylinder, a first inlet for the supply of fluid to the first chamber and a second inlet for the supply of fluid to the second chamber and with which inlets the first and the second chambers are placed into connection with an external circuit that is switched between filling and draining of fluid to and from the chambers, wherein the piston that supports the piston rod forms a primary part of a piston unit pair that also encompasses a secondary piston that is reciprocatingly mobile within the cylinder and that is taken up in the compartment between the primary piston and the sealing and rod-control unit, the primary piston has a channel that allows the transfer of fluid between the first and the second chamber, the secondary piston is arranged such that it is repositioned between a position in interaction that blocks the flow of fluid with the channel of the primary piston and a position that blocks the flow of fluid with the second inlet, the repositioning between the said blocking positions takes place through the influence of fluid pressure from the two inlets.

6. The hydraulic cylinder according to claim 5, wherein the secondary piston is arranged to be repositioned from its fluid-blocking interaction with the inlet by the influence of the fluid pressure from the said second inlet.

7. The hydraulic cylinder according to claim 6, wherein the secondary piston is arranged to be repositioned from its fluid-blocking interaction with the channel of the first piston by the influence of the fluid pressure from the first inlet.

8. The hydraulic cylinder according to claim 5, wherein the secondary piston is taken up by the piston rod in a manner that allows sliding control for the execution of axial motion along the second chamber.

9. The hydraulic cylinder according to claim 5, further comprising a constriction that limits flow with which the flow of fluid in association with the second inlet can be controlled.

* * * * *

UNITED STATES PATENT AND TRADEMARK OFFICE
CERTIFICATE OF CORRECTION

PATENT NO. : 8,375,593 B2  Page 1 of 1
APPLICATION NO. : 13/000258
DATED : February 19, 2013
INVENTOR(S) : Lundgren et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this
First Day of September, 2015

Michelle K. Lee
*Director of the United States Patent and Trademark Office*